(12) United States Patent
Ritchley

(10) Patent No.: US 9,894,107 B2
(45) Date of Patent: Feb. 13, 2018

(54) CONTROL MODULE FOR A CALL MANAGEMENT SYSTEM

(71) Applicant: Barnaby Thomas Ritchley, Harlow (GB)

(72) Inventor: Barnaby Thomas Ritchley, Harlow (GB)

(\*) Notice: Subject to any disclaimer, the term of this patent is extended or adjusted under 35 U.S.C. 154(b) by 0 days.

(21) Appl. No.: 14/907,070

(22) PCT Filed: Jul. 23, 2014

(86) PCT No.: PCT/GB2014/052244
§ 371 (c)(1),
(2) Date: Jan. 22, 2016

(87) PCT Pub. No.: WO2015/011469
PCT Pub. Date: Jan. 29, 2015

(65) Prior Publication Data
US 2016/0156675 A1    Jun. 2, 2016

(30) Foreign Application Priority Data
Jul. 23, 2013   (GB) .................................. 1313123

(51) Int. Cl.
*H04M 3/00* (2006.01)
*H04M 5/00* (2006.01)
(Continued)

(52) U.S. Cl.
CPC ........ *H04L 65/1056* (2013.01); *H04L 63/101* (2013.01); *H04L 67/2838* (2013.01);
(Continued)

(58) Field of Classification Search
CPC . H04L 63/101; H04L 63/104; H04L 65/1056; H04L 67/2838; H04M 3/42314; H04M 7/009
(Continued)

(56) References Cited

U.S. PATENT DOCUMENTS 8,316,457 B1\* 11/2012 Paczkowski .......... H04L 67/306
726/27
8,639,801 B2\* 1/2014 Francis ............... H04L 63/0272
709/220
(Continued)

OTHER PUBLICATIONS

International Search Report for Application No. PCT/GB2014/052244 dated Nov. 3, 2014.
(Continued)

*Primary Examiner* — Khai N Nguyen
(74) *Attorney, Agent, or Firm* — Lerner, David, Littenberg, Krumholz & Mentlik, LLP

(57) ABSTRACT

A control module arranged to manage a hosted communications platform, the hosted communications platform being located between a telecommunications network and a subscriber communications network, the subscriber communications network being associated with a subscriber to the hosted communications platform, the subscriber being associated with a plurality of users. The module comprises a first communications interface arranged to interface with the telecommunications network, and processing means arranged to configure the hosted communications platform for use with two or more subscribers, each subscriber comprising a respective subscriber communications network. The module further comprises a second communications interface arranged to interface with the hosted communications platform. For each subscriber, the processing means is arranged to form a partition on the hosted communications platform.

15 Claims, 5 Drawing Sheets

(51) Int. Cl.
*H04M 7/00* (2006.01)
*H04L 29/06* (2006.01)
*H04M 3/42* (2006.01)
*H04L 29/08* (2006.01)

(52) U.S. Cl.
CPC ......... *H04M 3/42* (2013.01); *H04M 3/42314* (2013.01); *H04L 63/104* (2013.01); *H04M 7/009* (2013.01)

(58) Field of Classification Search
USPC .................................................. 379/221.06
See application file for complete search history.

(56) References Cited

U.S. PATENT DOCUMENTS

| | | | | |
|---|---|---|---|---|
| 8,649,498 | B1* | 2/2014 | Rankin | H04M 3/42314 379/219 |
| 9,276,942 | B2* | 3/2016 | Srinivasan | G06Q 10/06315 |
| 2006/0023644 | A1* | 2/2006 | Jang | H04L 12/1813 370/261 |
| 2009/0192847 | A1* | 7/2009 | Lipkin | G06F 9/468 726/4 |
| 2012/0131643 | A1* | 5/2012 | Cheriton | H04L 63/0272 726/3 |
| 2012/0134355 | A1* | 5/2012 | Vendrow | G06F 11/2048 370/389 |
| 2013/0124546 | A1* | 5/2013 | Wormley | H04L 63/101 707/758 |
| 2013/0340051 | A1* | 12/2013 | Gangaraj Manoharan | G06F 21/6218 726/4 |
| 2014/0075565 | A1* | 3/2014 | Srinivasan | G06Q 10/06315 726/26 |
| 2014/0280602 | A1* | 9/2014 | Quatrano | H04W 4/08 709/205 |

OTHER PUBLICATIONS

International Written Opinion for Application No. PCT/GB2014/052244 dated Nov. 3, 2014.

* cited by examiner

CONTROL MODULE FOR A CALL MANAGEMENT SYSTEM

CROSS-REFERENCE TO RELATED APPLICATION

This application is a national phase entry under 35 U.S.C. § 371 of International Application No. PCT/GB2014/052244, filed Jul. 23, 2014, which claims priority to Great Britain Patent Application No. 1313123.0, filed Jul. 23, 2013, the disclosures of which are incorporated herein by reference.

FIELD OF THE INVENTION

This invention relates to a control module for a call management system, and in particular to a system for interfacing with CISCO Call Manager for call management.

BACKGROUND TO THE INVENTION

Many companies use a hosted telephone platform as a call management system in order to manage incoming and outgoing telephone calls to and from their internal telephones. In conventional systems, this involves implementing a phone system which is controlled by a common management application which acts as the hosted telephone platform, to which all telephones which belong to a company (or "subscriber") are connected. Each telephone in the system is assigned an extension code, typically of three or four digits in length. Additionally, each telephone may be assigned a direct-dial-in (DDI) number, which enables a phone which is external to the system to call a phone within the system. Any calls placed by a phone within the system are handled by the management application prior to being forwarded to an external telephone network. Correspondingly, the management application handles all incoming calls from external telephone networks, and forwards the calls to the appropriate telephone within the system.

One of the most commonly used management applications that provides the functionality of a hosted telephone platform is provided by CISCO, and is known as CISCO Unified Communications Manager (CUCM or CallManager). CUCM is installed on a server, and is configured to manage a particular subscriber's phone system. Installing and configuring an instance of CUCM is very costly, in part due to the high cost of the software licence, and also because the software is extremely complex and difficult to configure. The software is not designed to be user-friendly, and therefore only people with significant levels of training are able to configure the software for each subscriber.

Previously, each subscriber would have required a server with CUCM installed on it in order to manage their telephone system. However, in line with recent moves towards virtualisation and cloud computing, it is now more common for several subscribers to share a single server, with the server divided such that several instances of CUCM are installed on it, with an instance of CUCM for each subscriber. This deployment configuration is referred to as a Hosted Communications Solution (HCS), and is available to service providers from CISCO.

The physical specifications of the server, i.e. the memory and processing power available, place an upper limit on the number of instances of CUCM which may be installed on HCS. This therefore restricts the number of subscribers that can share that physical server. Also, in such systems there may be a restriction placed on the minimum number of users attached to each instance on CUCM. This therefore restricts the type of subscriber that can use such systems to those with a minimum number of associated users. Clearly, subscribers with a low number of associated users are unlikely to use such systems in any case, due to the high costs outlined above.

A single clustered instance of CUCM can accommodate up to 75,000 individual users. This is very useful for larger organisations, for which CUCM offers the benefit of being able to handle the entire organisation with a single cluster. However, for smaller organisations having a fraction of the number of users, much of this capacity is unused. This is wasteful in terms of hardware utilisation, and also raises the relative cost for the organisation, as the hardware cost and main licensing costs for the CUCM software are not substantially different to those for a much larger organisation. In fact, CISCO places a lower limit on the number of users that subscribers to such systems must have, typically 50.

A known alternative approach for implementing a CUCM based hosted telephone platform to those outlined previously is illustrated in FIG. 1. This implementation enables multiple subscribers to use a single instance of CUCM.

As shown in FIG. 1, in the known system a middleware application in the form of an interface module 10 is implemented to interface between the subscribers 12 and CUCM 14. The interface module 10 acts to effectively combine multiple subscribers 12 into a single subscriber 12, such that multiple subscribers 12 may be handled by a single instance of CUCM 14 in a multi-tenancy arrangement.

Clearly, there are several benefits to such a system. Firstly, the cost to each subscriber 12 is reduced, as they need only pay for a portion of the CUCM instance. Secondly, this arrangement raises the number of subscribers 12 that can share a single server, thereby reducing hardware requirements. This reduces the power requirements of the system, and also the cost. Furthermore, by allowing multiple subscribers 12 to share a single instance of CUCM 14, the system is able to reduce the number of users that each subscriber 12 must have. This is because the cost of implementing the instance of CUCM 14 is split between multiple subscribers 12, so it becomes more cost effective for subscribers 12 with lower numbers of users. Also, because the subscribers 12 are pooled together, the lower limit of typically 50 users applies to the pool of subscribers 12, rather than to each individual subscriber 12. Therefore, this approach opens up usage of CUCM 14 to subscribers 12 having less than the lower limit of the number of users, and indeed individual users can join the system as subscribers 12.

As shown in FIG. 1, two subscribers 12 (Company A and Company B) connect to a common interface module 10, which in turn connects to an instance of CUCM 14 which is installed on a server. CUCM 14 in turn connects to an external telephone network 16. Clearly, it is important that the system separates Company A from Company B, so that each subscriber 12 effectively has their own contained system. If subscribers 12 are not separated, each subscriber 12 is able to see the other subscribers 12 on the system. Therefore, for example, Company A would be able to see users associated with Company B, and furthermore users from Company A would be able to dial users belonging to Company B using internal extension codes. Such a situation is clearly undesirable.

Therefore, the interface module 10 ring-fences each subscriber 12 from all other subscribers 12, as indicated by the dashed line in FIG. 1. As the subscribers 12 do not interface directly with CUCM 14, they are not able to see one another.

However, as there is only a single instance of CUCM 14, the interface module 10 has to present both subscribers 12 to CUCM 14 as if they were a single subscriber 12, as CUCM 14 is not configured to separate subscribers 12 from each other. Therefore, in this system, CUCM 14 does not distinguish between Company A and Company B.

One consequence of this is that the two companies cannot have overlapping extension codes. Therefore, if, for example, Company A uses extension codes ranging from 2000 through to 2100, Company B must start their extension codes from 2101. This becomes problematic if Company A later wishes to add additional extension codes, as the new extension codes must follow those used by Company B, and therefore cannot be sequential with the rest of Company A's extensions. Alternatively, Company A must reserve additional extension codes which are not initially used, but are therefore available to them in the future. This latter approach obviously has the drawback that Company A pays for extension codes that they do not use.

Further to this, a particular problem arises if the subscribers 12 wish to map the last four digits of their DDI numbers to extension codes, as is common practice. So, for example, if Company A has DDI numbers ranging from 01234562000 through to 01234562100, they may wish to use the last four digits in that range, i.e. 2000-2100, as extension codes.

However, if Company B has DDI numbers in the range 01162342000 through to 01162342100, the last four digits for numbers in that range are the same as those for Company A. Therefore, if Company A maps the last four digits of their DDI numbers to extension codes, this option is not available to Company B, as the extension codes have already been used.

A conventional method that is used to overcome this problem is known as "extension masking". This involves adding a prefix to all numbers relating to users belonging to a particular subscriber 12, and hiding the prefix from the users. For example, all users for Company A have the prefix 123456 added to their extension codes, in which case when a user in Company A dials an extension, for example 2000, the prefix is added by CUCM 14, such that the number becomes 1234562000. The user only has to dial the short extension, i.e. "2000", and the prefix is added automatically in a process which is hidden from the user. This is known in the art as abbreviated dialling. In this way, CUCM 14 is able to direct the call to the correct user within that company. If Company B is assigned the prefix 654321, when a Company B user dials the same short extension (i.e. 2000), the number becomes 6543212000. This enables users of different subscribers 12 to be assigned apparently the same extension codes, because the portion of the extension code which is different is hidden from the users.

A drawback with this approach is that as the interface module 10 does not directly handle incoming calls, there is no way to mask the prefix for DDI numbers, which consequently become very long. Additionally, if the telephone system is integrated with an IT system such that a user is able to place phone calls directly from their computer, for example using Microsoft Outlook, it is not possible to mask the extension in the same way. Therefore, when the user installs the client for the phone system on their machine, they will see the full extension number without the masking, e.g. 1234562000, which is undesirable.

Against this background, it is desirable to provide a call management system which eliminates or substantially alleviates the above mentioned problems which are present in conventional systems.

SUMMARY OF THE INVENTION

According to a first aspect of the invention, there is provided a control module arranged to manage a hosted communications platform. The hosted communications platform is located between a telecommunications network and a subscriber communications network. The subscriber communications network is associated with a subscriber to the hosted communications platform, the subscriber being associated with a plurality of users. The control module comprises a first communications interface arranged to interface with the telecommunications network, and processing means arranged to configure the hosted communications platform for use with two or more subscribers, each subscriber comprising a respective subscriber communications network. The control module further comprises a second communications interface arranged to interface with the hosted communications platform. For each subscriber, the processing means is arranged to form a partition on the hosted communications platform.

By forming a partition for each subscriber, the control module retains the benefits offered by the interface module described above in that it enables more efficient usage of a hosted communications system such as CISCO Unified Communications Manager than is possible in conventional arrangements. As there is no lower limit on the number of users within a partition, the control module beneficially enables usage of the hosted communications platform by subscribers having small numbers of users, and even subscribers having a single user. Configuring the hosted communications platform in this way maximises usage of the capacity of the platform, thereby reducing both the required hardware resources and the financial outlay associated with operating the platform.

Partitioning the hosted communications platform is a more sophisticated approach than the interface module of FIG. 1, and advantageously eliminates many of the drawbacks associated with this prior art approach. As subscribers are separated within the hosted communications platform itself, problems with internal calls and direct-dial-in numbers do not arise as they do for the interface module arrangement. There is therefore no need to use extension masking or other techniques that require hardware resources to implement; once the control module has configured the hosted communications platform, all communications can be handled within the platform itself, provided that incoming communications include sufficient information to identify the partition containing the subscriber to which the communication is directed.

A particular benefit of this is that direct-dial-in numbers can be mapped to user extension codes, which is not possible with the interface module of FIG. 1. A further benefit is that the control module allows for full integration of the hosted communications platform with a subscriber's internal IT system, without having to display additional extension numbers such as those used in extension masking techniques.

The control module may be further arranged to act as an intermediary to handle all communications between the hosted communications platform and the telecommunications network, which may be a public switched telephone network, for example. This offers benefits such as the ability to record data regarding all incoming and outgoing communications, which may be useful for billing purposes, caller ID, voicemail and call recording, for example.

In this embodiment, the control module may be further arranged to configure at least one route pattern associated with the hosted communications platform, said route pattern being arranged to handle each outgoing communication from the hosted communications platform. The route pattern is a standard component of the hosted communications platform, and in this embodiment the control module is arranged to configure the route pattern. Configuring the route pattern would otherwise require significant expertise on the part of the user, and may take a considerable amount of time.

Conveniently, the or each route pattern may be configured to add a unique identifier to a user-dialled number defining the intended recipient of the communication, for example by prefixing the identifier to the user-dialled number. The unique identifier indicates the partition hosting the subscriber from which the communication originates, and so the control module may be arranged to use the unique identifier to identify the subscriber from which the communication originates. This provides a convenient means for recording which subscriber each outgoing communication originated from.

The control module may be further arranged to configure at least one translation pattern associated with the hosted communications platform, said translation pattern being used for handling each incoming communication to the hosted communications platform. Similarly to the route pattern above, the translation pattern is a standard component of the hosted communications platform that the control module is conveniently arranged to configure in this embodiment. In this case, the control module may be further arranged to attach a unique identifier to each incoming communication, the unique identifier indicating the partition hosting the subscriber to which the communication is directed. This provides a means for directing incoming communications to the correct partition. For example, the or each translation pattern may be arranged to use the unique identifier to identify the partition hosting the subscriber to which the communication is directed, and to forward the communication to that partition.

The control module may be further arranged to configure a calling search space associated with each partition to allow direct internal calls between users within each partition, and to deny direct internal calls between users in separate partitions. This approach advantageously emulates the behaviour of a conventional system having separate instances of the platform for each subscriber, in which users belonging to different subscribers are not able to dial each other internally.

In an embodiment of the invention, the or each subscriber communications network is an internal IP network that is connected to the hosted communications platform.

The present invention also extends to a call management system comprising a control module as described above in combination with a hosted communications platform arranged to host a plurality of subscribers. In such a system, the subscribers may be located remotely from the hosted communications platform, and are hosted through a network. This beneficially enables usage of the system by subscribers who are not located geographically in close proximity to the hosted communications platform.

BRIEF DESCRIPTION OF THE DRAWINGS

FIG. 1 is schematic drawing illustrating how multiple users are handled by a conventional call management system, and has already been described. In order that the invention may be more readily understood, preferred non-limiting embodiments thereof will now be described with reference to the remaining accompanying drawings, in which:

DETAILED DESCRIPTION OF EMBODIMENTS OF THE INVENTION

Figure 1:
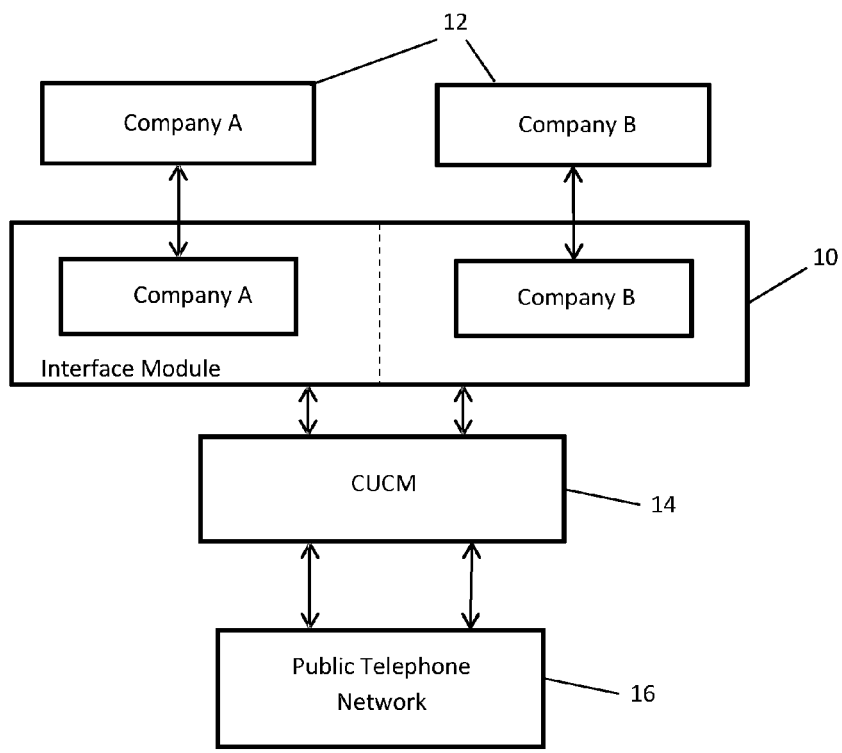

In the description that follows, a 'subscriber' is a company or organisation that subscribes to a hosted communications platform such as CUCM 14. Correspondingly, references to 'users' encompass individuals associated with a company or organisation that subscribes to CUCM 14 who are placing or receiving calls. Each subscriber 12 typically has a subscriber communications network through which it connects to CUCM 14, said network being an IP-address based data network.

Embodiments of the present invention make use of the fact that CUCM 14 is provided with the ability to form partitions. This ability is provided for the purpose of offering the ability to separate a subscriber's 12 different departments to account for differing restrictions for outbound calls which may be appropriate. For example, a subscriber 12 may have a marketing department and an R&D department. The subscriber 12 may wish to allow users in the marketing department to make international calls, whilst preventing users in the R&D department from doing so. Therefore, a partition can be created for each department, each configured appropriately for the departmental requirements.

Within such a setup, the partitions are not necessarily ring-fenced from one another, such that users in different departments are still able to phone each other internally. As noted above, configuring CUCM 14 is a complex process which can only be carried out by highly-qualified personnel. Therefore, to configure CUCM 14 in this sort of bespoke configuration is a time-consuming and expensive process.

Each partition has a calling search space associated with it, the calling search space defining the restrictions that are placed on calls originating from within the partition. The calling search space defines, for example, whether users within the partition may make international calls, or call users located in other partitions. Therefore, when a user from a particular partitioned department tries to place a call, CUCM 14 uses the calling search space to verify whether that call is allowable for the user. If the call is allowable, the call is connected. If the call is not allowable, the call is denied, typically by means of returning a "busy" tone to the user. The calling search space also includes a list of the extension codes for users in the partition, such that incoming calls may be directed appropriately.

In addition to the calling search spaces, the CUCM 14 includes translation patterns and route patterns which are used to direct calls.

Translation patterns are used to interpret the prefix of a call number for an incoming call, i.e. the part of the number in front of the extension code, and direct the call towards the correct calling search space. In the above described arrangement in which partitions are created to separate different departments, the system may be configured such that each partition is assigned a code, and the translation pattern includes a list of the codes for each partition. Therefore, the translation pattern is able to direct incoming calls towards the correct partition.

Route patterns are provided so that CUCM 14 is able to direct outgoing calls correctly. Without a route pattern, CUCM 14 has no means to make sense of the number attached to a phone call. The route pattern takes the prefix of the number of the outgoing call, which corresponds to the code assigned to the partition from which the call originates, and alters it appropriately for handling by a public switched telephone network (PSTN) 16. In this way, the CUCM 14 is able to handle incoming and outgoing calls to and from the different departments.

The ability to form partitions in CUCM 14 is made use of in a preferred embodiment of the invention, which is now described with reference to FIG. 2. As shown in the figure, a call management system 18 is provided which allows two subscribers 12, Company A and Company B, to share a single instance of CUCM 14. In this arrangement, a control module 20 is provided to act as an interface between an external telephone network 16 and CUCM 14. Accordingly, the control module 20 includes a first communications interface arranged to interface with the external telephone network 16, and a second communications interface arranged to interface with CUCM 14. The control module 20 also includes processing means, such as a processor, arranged to configure CUCM 14 for use with two or more subscribers 12 by partitioning CUCM 14.

Therefore, in contrast to previously described arrangements, in this system the instance of CUCM 14 has been divided into partitions, such that each subscriber 12 is assigned a respective partition 22 within the instance of CUCM 14.

As shown, each subscriber 12 communicates directly with its associated partition 22 within CUCM 14. Unlike conventional systems in which partitions are used to separate different departments belonging to a single subscriber 12, in this arrangement CUCM 14 is configured by the control module 20 such that the partitions 22 are unable to communicate with one another. Therefore, users within Company A's system are not able to directly dial users within Company B's system; they must effectively make an external call to do so. In this way, the partitions 22 act in a similar manner to separate instances of CUCM 14, albeit with the total capacity of the instance of CUCM 14 split between the partitions 22. This is achieved by configuring the calling search spaces for each partition 22 such that direct internal calls to all other partitions 22 are denied.

Furthermore, route patterns and translation patterns are configured in order to work alongside the control module 20.

Route patterns are set up for handling outgoing calls destined for a PSTN 16. When a user wishes to make an external call, they may add a prefix to the calling number to indicate that the call is to be routed to a PSTN 16. An example of this is dialling 9 at the start of the number. Alternatively, CUCM 14 may be configured such that a manually entered prefix is not required.

The route pattern is arranged to add a unique identifier indicating the partition 22 that the user belongs to as a prefix, to form a composite number; the unique identifier is added in addition to any manually entered prefix entered by the user. This composite number is forwarded to the control module 20, which strips all prefixes in order to determine the partition 22 from which the call originated, and the nature of the call i.e. external. The control module 20 then adjusts the number such that it is suitable for forwarding to the PSTN 16.

For incoming calls, a translation pattern is configured to perform a reverse operation. When an incoming call reaches the control module 20, the control module 20 compares the number against a list of DDI numbers of all users within the CUCM 14. Once the user has been identified, the control module 20 adjusts the number such that it is made up simply of a unique identifier prefix and an extension code. This is forwarded to the CUCM 14, where the translation pattern is arranged to strip the unique identifier prefix and identify the partition 22 to which to user belongs. The call is then forwarded to the calling search space associated with the identified partition 22. The calling search space then uses the extension code to connect the call.

Figure 2:
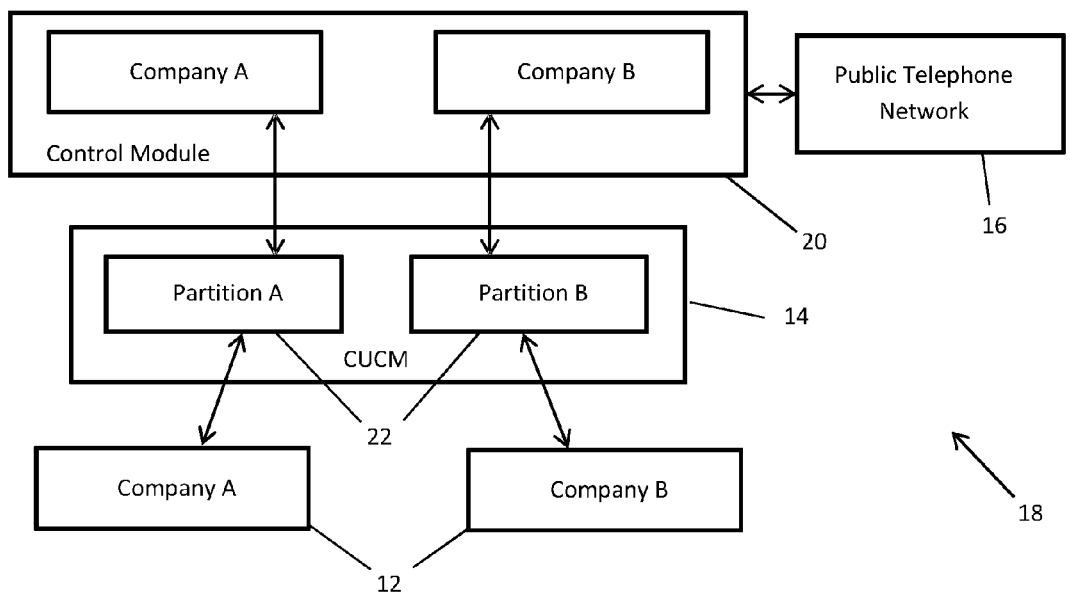
FIG. 2 is a schematic drawing illustrating how multiple users are handled by a call management system according to an embodiment of the present invention.

The call management system 18 shown in FIG. 2 provides an alternative multi-tenancy arrangement to the arrangement shown in FIG. 1. Thus, by allowing multi-tenancy of the CUCM 14, the arrangement of FIG. 2 offers all of the same advantages as the arrangement of FIG. 1, i.e. reducing costs for the subscribers 12; reducing the hardware requirements; maximising the number of subscribers 12 and users that can be managed by a single instance of CUCM 14; and providing a system which is more attractive to smaller subscribers 12 having fewer users.

In addition to these benefits, by using the control module 20 to partition the CUCM instance, the previously described problem of overlapping extension codes is overcome, as CUCM 14 is able to re-use extension codes between different partitions 22. Therefore, in the call management system 18 shown in FIG. 2, both Company A and Company B can use extension codes in the range 2000 to 2100 if so desired. Because of the way the partitions 22 are configured, there is no way for a user belonging to one partition 22 to dial a user in another partition 22 by just dialling an extension code, therefore there is no reason why extension codes may not be re-used in each partition 22. This enables each subscriber 12 to define which extension codes they wish to use in the same way that they would be able to if they had their own individual server and instance of CUCM 14. Accordingly, if a subscriber 12 wishes to use the last four digits of their DDI numbers as the extension codes, this can be achieved with this arrangement, in contrast with the problems described in relation to the arrangement of FIG. 1.

Internal calls are handled automatically by CUCM 14 within each partition 22 in the same way as for a configuration where partitions 22 are used for different departments of a single organisation. This is a clear improvement over the convoluted approach implemented in the known system of FIG. 1, in which internal calls must be handled by the interface module 10 using extension masking. Calls between users in different partitions 22 are treated as external calls, which similarly reduces system complexity compared with the FIG. 1 arrangement.

Additionally, this call management system 18 allows for better integration with an IT system, such that short extensions may be used when dialling directly from a computer. This provides a more elegant solution to the problem of sharing extension codes than the previously described method of extension masking, as this system is able to maintain the extension codes for DDI numbers also, as will be described more fully later with reference to FIGS. 4 and 5.

Therefore, the control module 20 according to embodiments of the present invention partitions the CUCM 14 in such a way that each partition 22 acts as a separate instance of CUCM 14, i.e. the partitions 22 act independently of one another. The only limitation to this is that the total capacity of the partitioned instance of CUCM 14 (i.e. 75,000 users) is divided between the partitions 22. This arrangement therefore combines all of the advantages of the multi-tenancy arrangement of FIG. 1 with the advantages of conventional arrangements in which multiple instances of CUCM 14 are installed on a single server.

It is noted that the call management system 18 of FIG. 2 retains the ability to provide a number of separate instances of CUCM 14 on a single server. Therefore, once the first instance of CUCM 14 has been partitioned to accommodate several different subscribers 12 such that the total user capacity is reached, a new virtualised instance of CUCM 14 can be installed on the same physical server, which can then be partitioned in the same way. Therefore, the total number of users that may be accommodated by a single physical server is potentially much higher than for the conventional arrangement. A new instance of CUCM 14 may be controlled by a respective control module 20, or a common control module 20 may be used to control all instances of CUCM 14 on a single server.

Figure 3:
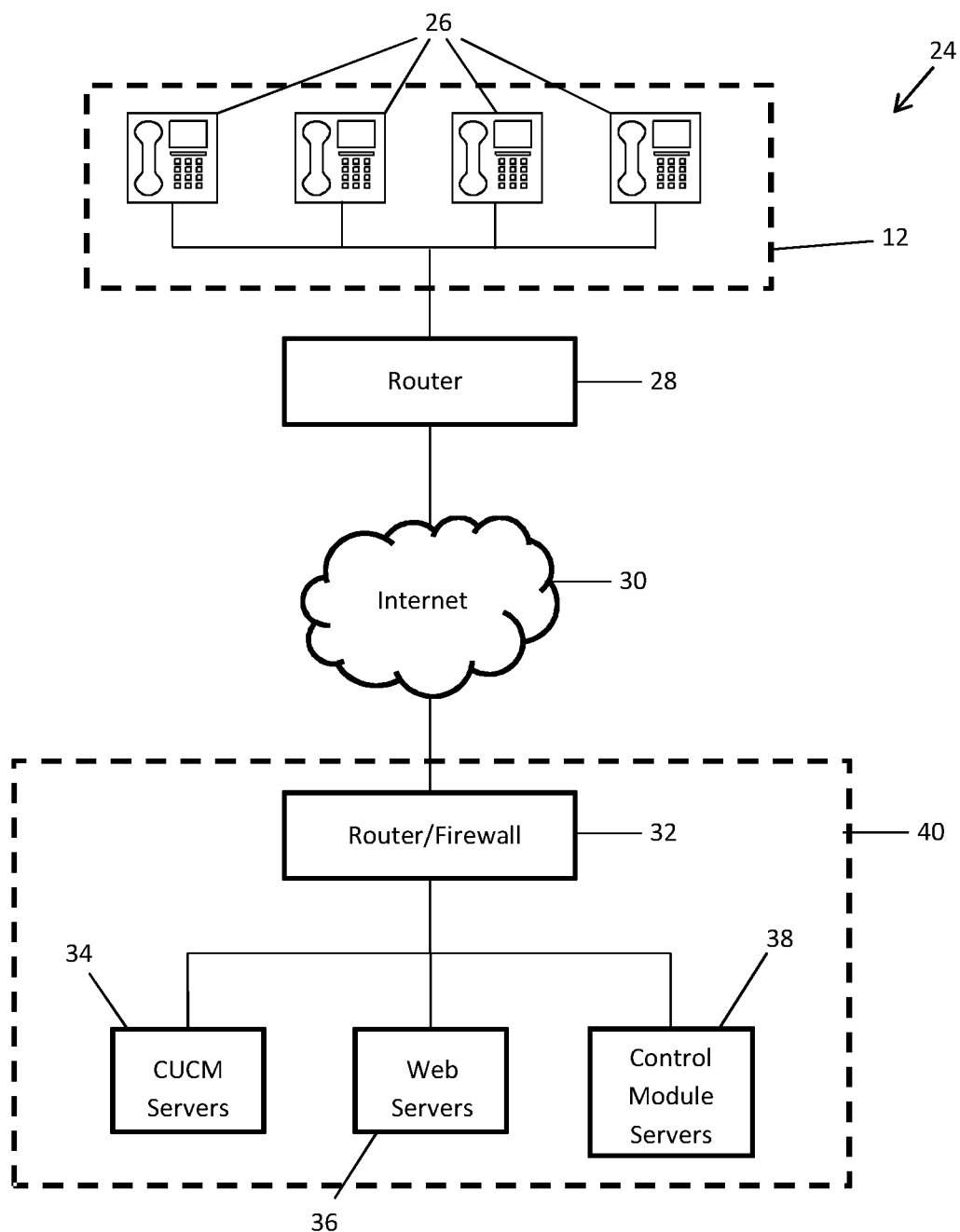
FIG. 3 is a schematic drawing illustrating an architecture for implementing the call management system in FIG. 2.

With reference to FIG. 3, an overall architecture 24 of a typical implementation for the call management system 18 of FIG. 2 is shown. It is noted that the architecture 24 represents the physical hardware required to implement the call management system 18, which thus far has been described in functional terms. Accordingly, FIG. 3 illustrates physical hardware that can be used to implement each of the components of the system, such as the control module 20, which have also been described in function terms thus far. For simplicity, the functional modules described previously are not shown in FIG. 3.

As shown in the figure, at the top level there are a number of individual users 26, represented as telephone terminals, each belonging to a common subscriber 12. These users 26 are grouped together at a router 28 to form a subscriber communications network, which then provides a connection to the World Wide Web 30 using a standard communications protocol. A second router and/or a firewall 32 is used to establish a connection between the users 26 at one end, and CUCM servers 34 used to host instances of CUCM 14, web/media/file servers 36, and servers 38 hosting control modules 20 at the other end. The CUCM servers 34, the web/media/file servers 36, and the servers 38 hosting the control module(s) 20 are all connected to a common local network 40. The users 26 are located remotely from this local network 40, which provides this implementation the benefit that subscribers 12 using the system do not need to be located in the same geographical location. Therefore, a number of subscribers 12 in a range of locations can all take advantage of the call management system 18. This allows for a service provider to utilise the call management system 18 in order to provide a hosted telephone platform for a range of remote subscribers 12.

Figure 4:
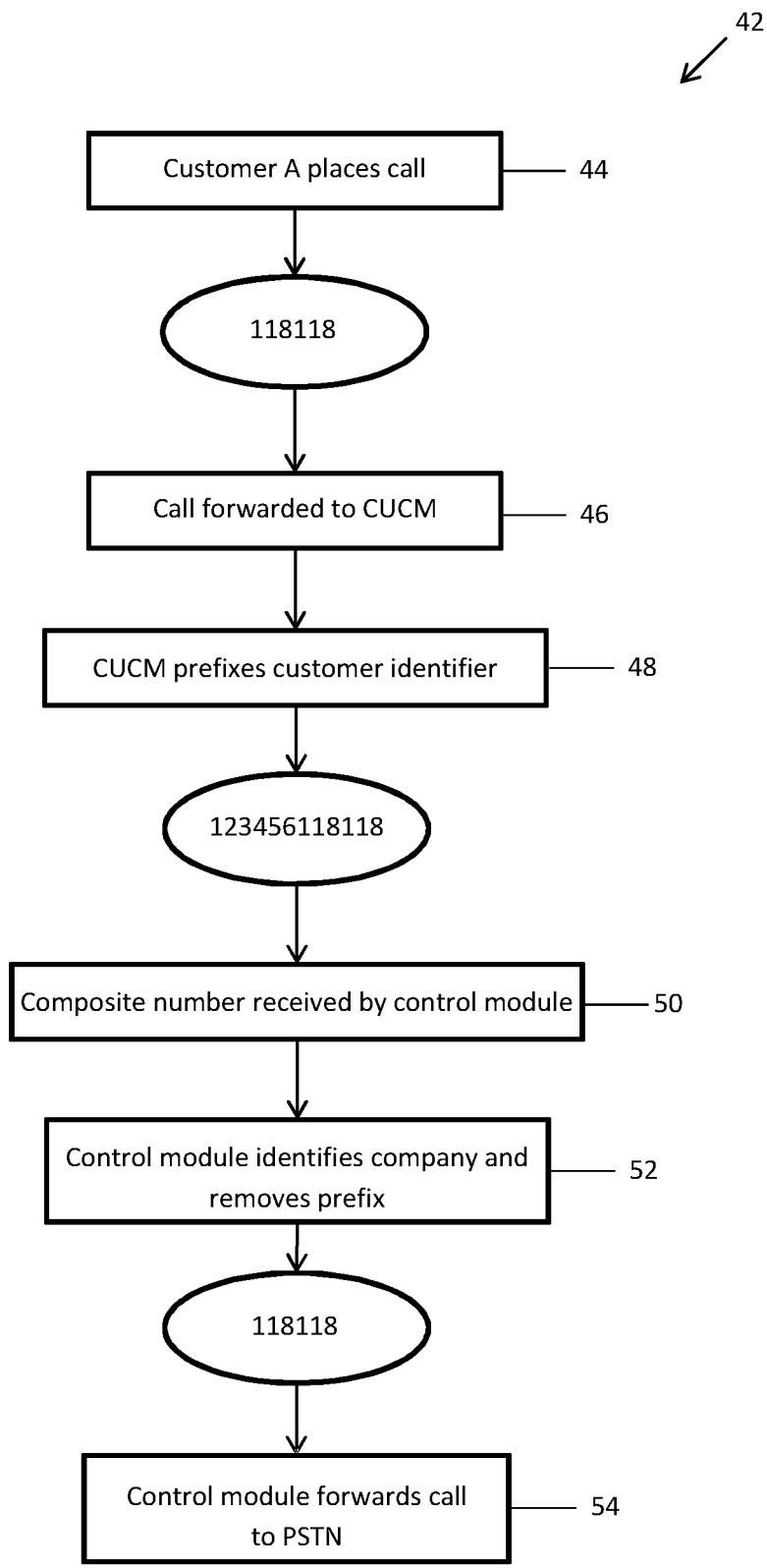
FIG. 4 is a flow diagram illustrating a user making an outgoing call using the call management system of FIG. 2.

FIG. 4 shows a process 42 for making an outbound call from the call management system 18 of FIG. 2. First, a user belonging to a subscriber 12 of the system places at step 44 a call, for example by dialling "118118". A manual prefix such as '9' will be entered if required, although for simplicity in this example it will be assumed that a manually entered prefix is not needed.

The call is forwarded at step 46 to the CUCM 14, which uses a route pattern to prefix at step 48 a unique identifier to the number which relates to the subscriber 12 that the user belongs to, thus creating a composite number; in this case, the prefix "123456" is used, thus the number becomes "123456118118". This composite number is then sent on and received at step 50 by the control module 20. The control module 20 checks the prefix, and uses this data to identify the user. The control module 20 then removes at step 52 the prefix from the number, and forwards at step 54 the call to a PSTN 16. The call is then connected, and the process 42 ends.

It is noted that the process 42 outlined above includes adding a prefix initially, and then removing the prefix again before forwarding the call to a PSTN 16. The call process is handled in this way so as to provide the control module 20 with a mechanism for tracking calls that are placed to the external PSTN 16. The tracking mechanism is provided by the use of the prefix which is a unique (subscriber) identifier which allows the control module 20 to identify which user has placed the call. The addition and removal of the prefix during the "dialling out" process allows various supplementary functions, such as billing or caller ID, to be provided.

Figure 5:
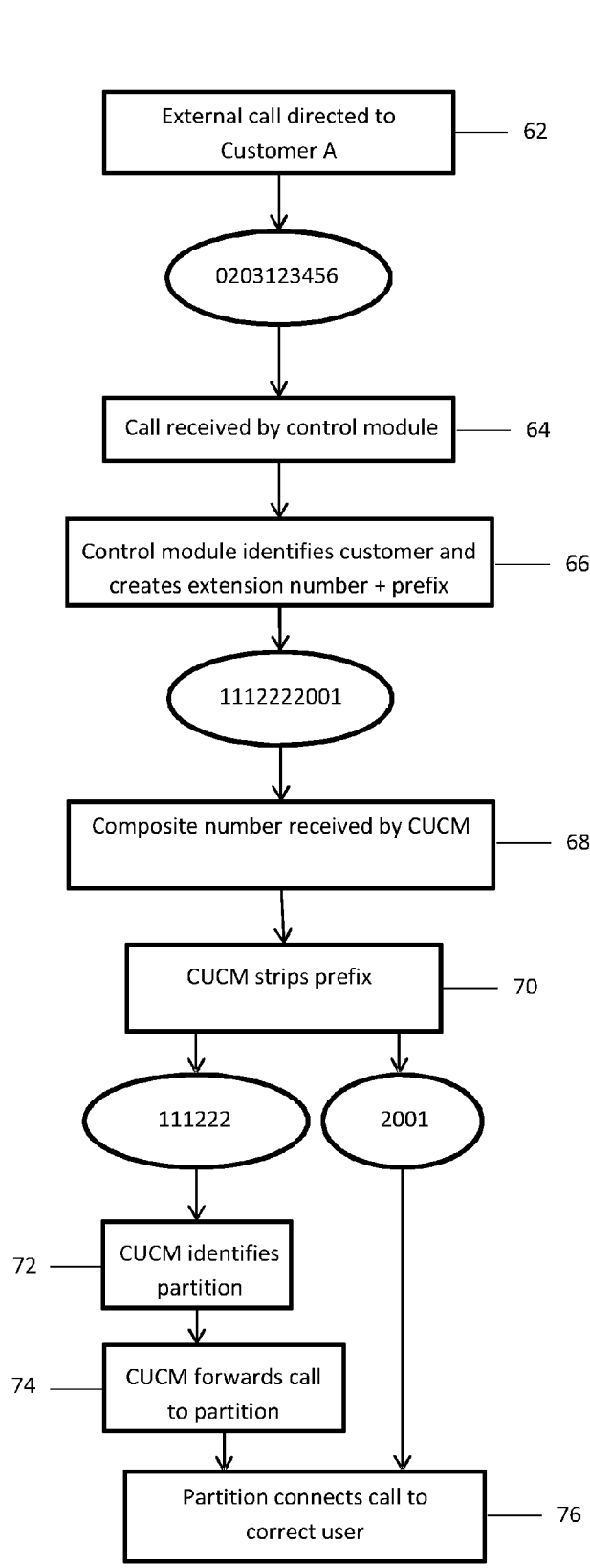
FIG. 5 is a flow diagram illustrating a user receiving an incoming call using the call management system of FIG. 2.

FIG. 5 shows a process 60 undertaken by the call management system 18 when receiving an external call. A call is directed at step 62 to a user belonging to a subscriber 12 of the call management system 18; in this example the DDI number used is "0203123456". The call is initially received at step 64 by the control module 20. The control module 20 uses the DDI number to identify at step 66 the user to which the call is directed. The control module 20 then uses this information to create the appropriate prefix and extension code, which are forwarded to the CUCM 14 as a composite number. In this example, the prefix is "111222", which is the unique identifier that relates to the partition 22 of the CUCM 14 that the call should be directed to (i.e. the partition 22 containing the subscriber 12 to which the user belongs), and the extension is "2001", which is specific to the user. Therefore, the composite number forwarded to the CUCM 14 is "1112222001". The CUCM 14 receives at step 68 the composite number, and strips at step 70 the prefix to separate it from the extension code.

The CUCM 14 uses a translation pattern to identify at step 72 which partition 22 the prefix relates to, and forwards at step 74 the call to that partition 22. The partition 22 then uses the extension code to connect at step 76 the call to the correct user.

As noted previously, it is often desirable to map the last four digits of a user's DDI number to the extension code for the user. In the above example, this would entail a DDI number of "0203122001". For this case, the control module 20 would perform the same operation as outlined above in order to connect the call. While it may be possible to map extension numbers to DDI numbers in a conventional extension masking system, typically such systems are limited to eight digit extension numbers. CUCM 14 in particular has a fixed limit of eight digits for an extension number. In addition to this, because the extension numbers need to be arranged to fit into a local dial plan, there are further restrictions on which extension numbers are available. For example, if a local dial plan is configured such that users must dial "9" to access an external line, extension numbers beginning with a "9" cannot be used in CUCM 14, as this would be interpreted as someone attempting to place an external call. Furthermore, London telephone numbers having an "020" prefix could cause a problem, as the prefix is not included in the local dial plan for these numbers. Therefore, the call management system 18 here described offers enhanced flexibility, in that there is no upper limit on the number of digits that may be used, and also the system operates semi-independently of the local dial plan, thereby avoiding the above described restrictions.

Figure 6:
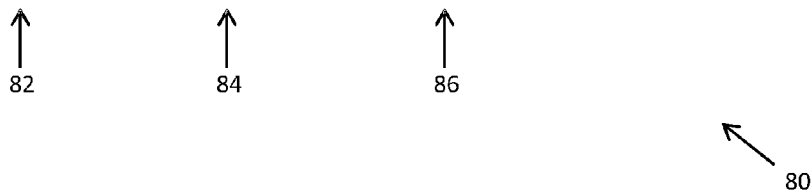
FIG. 6 is a table illustrating data that is held within that call management system of FIG. 2 for each user of the system.

FIG. 6 illustrates a set of data 80 for a sample of users that are using the call management system 18. As shown in the table, each user has a DDI number 82. Each DDI number 82 is associated with a unique (subscriber) identifier number 84, which corresponds to the partition 22 that the user is contained within. In the table, there are two DDI numbers 82 (i.e. 0203123456 and 0203123446), corresponding to two distinct users, that have the same unique identifier (i.e. 111222) 84. This indicates that those two users are in the same partition 22, which means that they belong to the same subscriber 12. However, their extension codes 86 are different, so that each user may be reached individually within the partition 22. The third DDI number 82 included in the table (i.e. 0203123466) corresponds to a different unique identifier 84 (i.e. 111223), indicating that the user belongs to a different subscriber 12 to the first two users. As the third user is in a separate partition 22, their extension code 86 can be the same as that for users in other partitions 22, hence the extension code 86 is again 2001. The remaining data in the table relates to restrictions that are placed on calls originating from each partition 22. As shown, users in the first partition 22 are allowed to place international calls, but are not able to make calls to users in other partitions 22, and users in the second partition 22 are not allowed to make international calls or call users in other partitions 22.

The data shown in FIG. 6 is all held by the control module 20. Additionally, the calling search spaces are provided with the data in all but the first column (i.e. all data except DDI numbers), and the route patterns and translation patterns are provided with the unique identifiers.

The control module 20 is arranged to configure the CUCM 14 according to the subscriber's 12 requirements with minimal user input. Each time a new subscriber 12 is added to the system, the control module 20 creates a corresponding partition 22 for that subscriber 12 based on basic information provided by the user. In this way, the configuration of the CUCM 14 may be regarded as semi-automatic, meaning the subscriber 12 does not need to manually configure the CUCM 14, which, as noted above, is a complex and time-consuming process that can only be carried out by highly trained personnel. Therefore the set-up process for a new subscriber 12 is substantially simplified, which is a clear benefit of the call management system 18. The control module 20 enables the user to configure the remaining options, such as adding extensions or setting up voicemail or call recording, through a simple user interface. The user interface is arranged to be easily operable for a person who has had no training. This simple set-up process is in direct contrast with the complex set-up process for the CUCM 14 itself.

A further benefit provided by the call management system 18 is that processes such as billing and call recording are significantly simplified in comparison to other multi-tenancy arrangements by virtue of the unique identifiers that are attached to incoming and outgoing calls. In the multi-tenancy arrangement of FIG. 1, for example, billing for individual users can be difficult because the CUCM 14 does not have the capability to record the calls made by individual users, and the interface module 10 is not configured to record this information either. Therefore, a separate billing module is required to record this information. In the call management system 18 of FIG. 2, as described previously, each subscriber 12 is assigned a unique identifier, and the control module 20 is arranged to record each time a call is placed by each user by recognising the unique identifiers and extension codes.

Because all calls are routed through the control module 20, it is possible for the control module 20 to add new functionality. For example, the control module 20 may be arranged to record calls to a hard disk for retrieval later by a user. Similarly, the control module 20 may be arranged to provide a voicemail function, by intercepting calls when the users to whom the calls are directed are not available. As above, these are features which in conventional systems require additional modules to provide the functionality. Therefore, the call management system 18 beneficially combines a range of functions into a single system.

This becomes particularly important when the call management system 18 is operated by a service provider who provides a hosted telephone platform for a range of subscribers 12. In conventional arrangements, each subscriber 12 requires their own billing modules, voicemail modules, etc. It is typical for a service provider to have up to 1000 subscribers 12 using their system, which entails thousands of additional modules for handling the additional features of billing, voicemail, etc. This is an inefficient arrangement which requires a high level of maintenance from the service provider. As noted above, the call management system 18 described here is able to provide all of the additional features without requiring additional modules. Therefore, the benefit to the service provider can be significant.

It will be appreciated by a person skilled in the art that the invention could be modified to take many alternative forms to that described herein, without departing from the scope of the appended claims.

The invention claimed is:

1. A control module arranged to manage a hosted communications platform, the hosted communications platform being located between a telecommunications network and a subscriber communications network, the subscriber communications network being associated with a subscriber to the hosted communications platform, the subscriber being associated with a plurality of users, the module comprising:
   a first communications interface arranged to interface with the telecommunications network;
   processing means arranged to configure the hosted communications platform for use with two or more subscribers, each subscriber comprising a respective subscriber communications network comprising one or more users grouped at a router; and
   a second communications interface arranged to interface with the hosted communications platform;
   wherein, for each subscriber, the processing means is arranged to form a partition on the hosted communications platform, whereby the partitions of the hosted communications platform are unable to directly internally communicate with one another.

2. The control module of claim 1, further arranged to act as an intermediary to handle all communications between the hosted communications platform and the telecommunications network.

3. The control module of claim 2, further arranged to configure at least one route pattern associated with the hosted communications platform, said route pattern being arranged to handle each outgoing communication from the hosted communications platform.

4. The control module of claim 3, wherein the or each route pattern is configured to add a unique identifier to a user-dialled number defining the intended recipient of the communication, the unique identifier indicating the partition hosting the subscriber from which the communication originates.

5. The control module of claim 4, wherein the unique identifier is prefixed to the user-dialled number.

6. The control module of claim 4, wherein the control module is arranged to use the unique identifier to identify the subscriber from which the communication originates.

7. The control module of claim 1, further arranged to configure at least one translation pattern associated with the hosted communications platform, said translation pattern being used for handling each incoming communication to the hosted communications platform.

8. The control module of claim 7, further arranged to attach a unique identifier to each incoming communication, the unique identifier indicating the partition hosting the subscriber to which the communication is directed.

9. The control module of claim 8, wherein the or each translation pattern is arranged to use the unique identifier to identify the partition hosting the subscriber to which the communication is directed, and to forward the communication to that partition.

10. The control module of claim 1, further arranged to configure a calling search space associated with each partition to allow direct internal calls between users within each partition, and to deny direct internal calls between users in separate partitions.

11. The control module of claim 1, wherein the hosted communications platform is CISCO Unified Communications Manager.

12. The control module of claim 1, wherein the telecommunications network is a public switched telephone network.

13. The control module of claim 1, wherein the or each subscriber communications network is an internal IP network that is connected to the hosted communications platform.

14. A call management system comprising:
 a hosted communications platform arranged to host a plurality of subscribers; and
 a control module arranged to manage the hosted communications platform, the hosted communications platform being located between a telecommunications network and a subscriber communications network, the subscriber communications network being associated with a subscriber to the hosted communications platform, the subscriber being associated with a plurality of users, the control module comprising:
 a first communications interface arranged to interface with the telecommunications network;
 processing means arranged to configure the hosted communications platform for use with two or more subscribers, each subscriber comprising a respective subscriber communications network comprising one or more users grouped at a router; and
 a second communications interface arranged to interface with the hosted communications platform;
 wherein, for each subscriber, the processing means is arranged to form a partition on the hosted communications platform, whereby the partitions of the hosted communications platform are unable to directly internally communicate with one another.

15. The system of claim 14, wherein the subscribers are located remotely from the hosted communications platform, and are hosted through a network.

* * * * *